US012450429B2

(12) United States Patent
Rajan et al.

(10) Patent No.: US 12,450,429 B2
(45) Date of Patent: Oct. 21, 2025

(54) OFFLINE SPELLCHECK CANDIDATES COMPLEMENTING RUNTIME SPELLCHECK

(71) Applicant: Walmart Apollo, LLC, Bentonville, AR (US)

(72) Inventors: Adithya Rajan, Edison, NJ (US); Weiqi Tong, Brooklyn, NY (US); Zheng Yan, Short Hills, NJ (US)

(73) Assignee: WALMART APOLLO, LLC, Bentonville, AR (US)

( * ) Notice: Subject to any disclaimer, the term of this patent is extended or adjusted under 35 U.S.C. 154(b) by 339 days.

(21) Appl. No.: 18/103,195

(22) Filed: Jan. 30, 2023

(65) Prior Publication Data

US 2024/0256768 A1 Aug. 1, 2024

(51) Int. Cl.
*G06F 40/232* (2020.01)
*G06F 16/2455* (2019.01)

(52) U.S. Cl.
CPC ...... *G06F 40/232* (2020.01); *G06F 16/24552* (2019.01)

(58) Field of Classification Search
CPC .......................... G06F 40/232; G06F 16/24552
See application file for complete search history.

(56) References Cited

U.S. PATENT DOCUMENTS

| | | | |
|---|---|---|---|
| 6,047,300 A * | 4/2000 | Walfish | G06F 40/232 715/257 |
| 6,401,084 B1 | 6/2002 | Ortega et al. | |
| 7,669,112 B2 | 2/2010 | Bates et al. | |
| 8,201,086 B2 * | 6/2012 | Kritt | G06F 40/232 715/257 |
| 8,655,904 B2 * | 2/2014 | Baird-Smith | G06F 16/907 707/767 |
| 9,047,012 B1 * | 6/2015 | Bringert | G06F 40/232 |
| 9,251,294 B2 * | 2/2016 | Nevidomski | G06F 16/90344 |
| 10,936,813 B1 * | 3/2021 | Gupta | G06F 40/263 |

(Continued)

OTHER PUBLICATIONS

Nather "An In-Depth Comparison of 14 Spelling Correction Tools on a Common Benchmark". Proceedings of the 12th Conference on Language Resources and Evaluation (LREC 2020), pp. 1849-1857 Marseille, May 11-16, 2020 (Year: 2020).*

Zolzaya et al. "Normalization of Transliterated Words Using Seq2Seq Model with Spell Checker". 26th Annual Conference of the Association for Natural Language Processing, 2020. (Year: 2020).*

(Continued)

*Primary Examiner* — Jesse S Pullias
(74) *Attorney, Agent, or Firm* — FOLEY & LARDNER LLP

(57) ABSTRACT

A method including extracting queries from historical search query data. The method also can include spellchecking each of the queries (i) using a first spellcheck model and (ii) using a second spellcheck model. A latency of the first spellcheck model is lower than a latency of the second spellcheck model, and an overall accuracy of the second spellcheck model is higher than an overall accuracy of the first spellcheck model. The method additionally can include determining first queries of the queries in which, for each of the first queries, a first respective spellcheck output from the first spellcheck model is different from a second respective spellcheck output from the second spellcheck model. The method further can include adding at least a portion of the first queries to a spellcheck cache for runtime spellchecking. Other embodiments are described.

20 Claims, 5 Drawing Sheets

(56) References Cited

U.S. PATENT DOCUMENTS

| | | |
|---|---|---|
| 2008/0147637 A1 | 6/2008 | Li et al. |
| 2008/0249764 A1 | 10/2008 | Huang et al. |
| 2009/0089261 A1* | 4/2009 | Leher .................. G06F 16/3322 |
| 2010/0325539 A1* | 12/2010 | Nedzlek .................. G06F 16/93 |
| | | 715/257 |
| 2012/0284308 A1* | 11/2012 | Paduroiu ............... G06F 40/232 |
| | | 707/E17.014 |
| 2013/0060560 A1* | 3/2013 | Mahkovec ............ G06F 40/232 |
| | | 704/9 |
| 2020/0226211 A1* | 7/2020 | Brake ...................... G06N 5/02 |
| 2020/0356578 A1* | 11/2020 | Frieder .................. G06N 20/00 |
| 2022/0269857 A1* | 8/2022 | Carrier .................. G06F 40/284 |
| 2022/0382818 A1 | 12/2022 | Chen et al. |

OTHER PUBLICATIONS

Chen, T., "Batch Interference in Azure Machine Learning," Microsoft Community Hug, retrieved from https://techcommunity.microsoft.com/t5/ai-machine-learning-blog/batch-inference-in-azure-machine-learning/ba-p/1417010 on Jan. 1, 2023 May 26, 2020.

Kuznetsov, A. and Urdiales, H., "Spelling Correction With Denoising Transformer," Retrieved from arXiv:2105.05977v1 [cs.CL] May 12, 2021.

Lakhotia, N., "Spelling Rectification App Using TextBlob & Pyspellchecker," published in Towards Data Science on Ocotober 5, 2020, retrieved on Jan. 5, 2023, from https://towardsdatascience.com/spelling-rectification-app-using-textblob-pyspellchecker-cb3ad0504fc7 Oct. 5, 2020.

* cited by examiner

OFFLINE SPELLCHECK CANDIDATES COMPLEMENTING RUNTIME SPELLCHECK

TECHNICAL FIELD

This disclosure relates generally to offline spellcheck candidates complementing runtime spellcheck.

BACKGROUND

Several websites that provide search functionality also use spellcheck to provide corrected spelling for search queries with spelling errors. As spellcheck systems have improved to be more accurate, the latency involved in performing spellchecking has often increased, such that the latency involved in running a state-of-the-art spellcheck system can be higher than desired for spellchecking a search query.

BRIEF DESCRIPTION OF THE DRAWINGS

To facilitate further description of the embodiments, the following drawings are provided in which.

Figure 1:
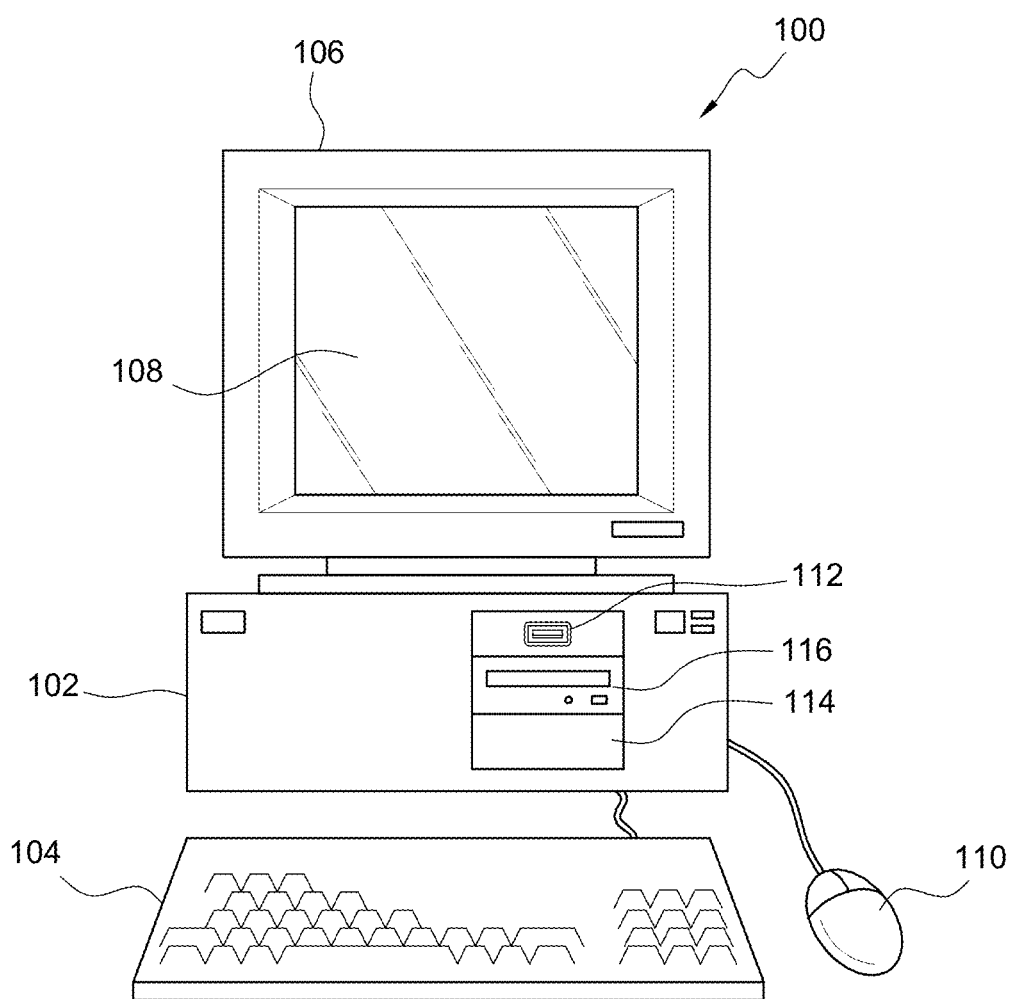
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately 50 milliseconds (ms).

DESCRIPTION OF EXAMPLES OF EMBODIMENTS

Figure 2:
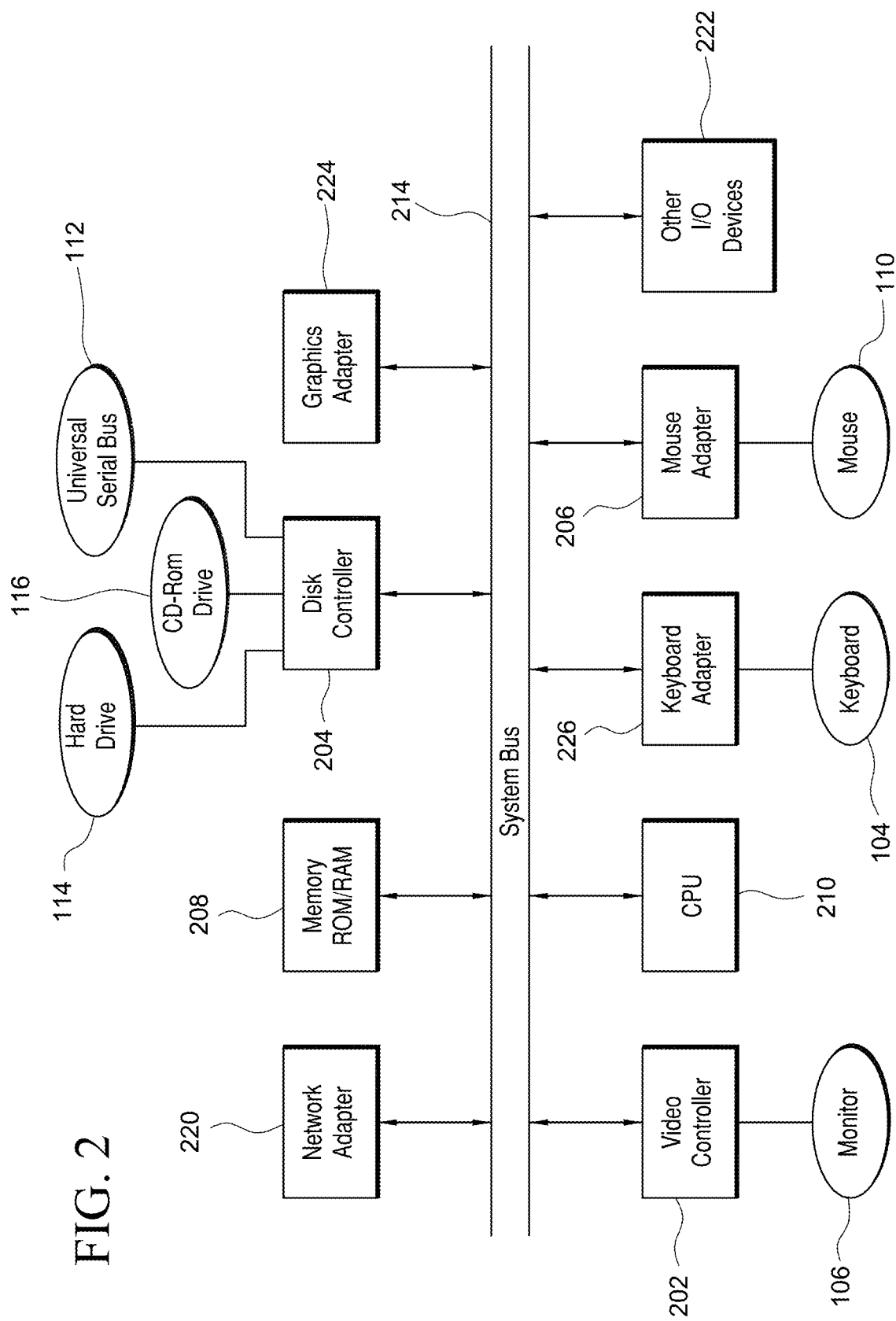
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the WebOS operating system by LG Electronics of Seoul, South Korea, (iii) the Android™ operating system developed by Google, of Mountain View, California, United States of America, or (iv) the Windows Mobile™ operating system by Microsoft Corp. of Redmond, Washington, United States of America.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computer system 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
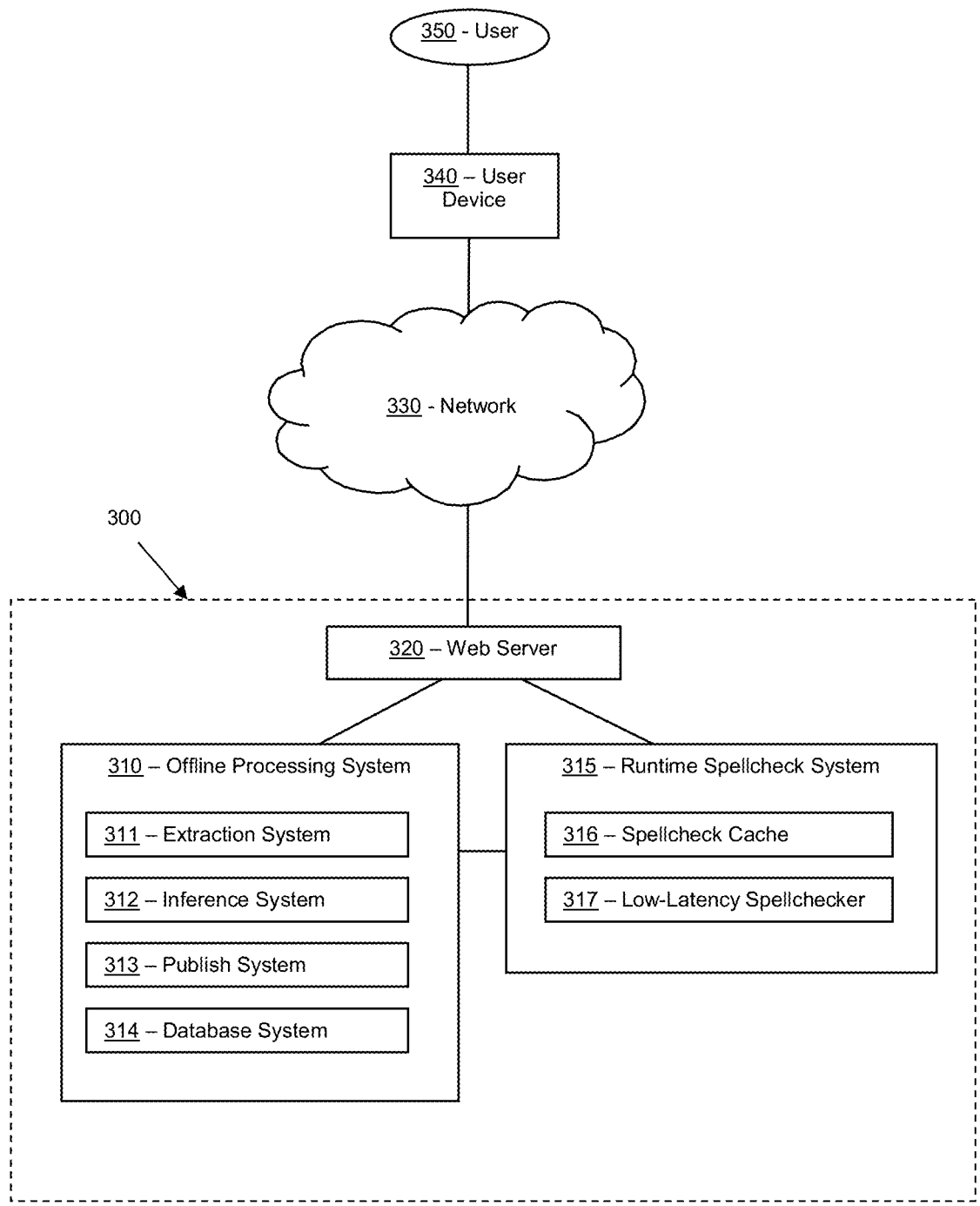
FIG. 3 illustrates a block diagram of a system that can be employed for offline spellcheck candidates complementing runtime spellcheck, according to an embodiment.

Turning ahead in the drawings, FIG. 3 illustrates a block diagram of a system 300 that can be employed for offline spellcheck candidates complementing runtime spellcheck, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include an offline processing system 310, a runtime spellcheck system 315, and/or a web server 320.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Offline processing system 310, runtime spellcheck system 315, and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host offline processing system 310, runtime spellcheck system 315, and/or web server 320. Additional details regarding offline processing system 310, runtime spellcheck system 315, and/or web server 320 are described herein.

In some embodiments, web server 320 can be in data communication through a network 330 with one or more user devices, such as a user device 340. User device 340 can be part of system 300 or external to system 300. Network 330 can be the Internet or another suitable network. In some embodiments, user device 340 can be used by users, such as a user 350. In many embodiments, web server 320 can host one or more websites and/or mobile application servers. For example, web server 320 can host a website, or provide a server that interfaces with an application (e.g., a mobile application), on user device 340, which can allow users (e.g., 350) to search for items (e.g., products, grocery items), to add items to an electronic cart, and/or to purchase items, in addition to other suitable activities, or to interface with and/or configure offline processing system 310 and/or runtime spellcheck system 315.

In some embodiments, an internal network that is not open to the public can be used for communications between offline processing system 310, runtime spellcheck system 315, and/or web server 320 within system 300. Accordingly, in some embodiments, offline processing system 310 and runtime spellcheck system 315 (and/or the software used by such systems) can refer to a back end of system 300 operated by an operator and/or administrator of system 300, and web server 320 (and/or the software used by such systems) can refer to a front end of system 300, as is can be accessed and/or used by one or more users, such as user 350, using user device 340. In these or other embodiments, the operator and/or administrator of system 300 can manage system 300, the processor(s) of system 300, and/or the memory storage unit(s) of system 300 using the input device(s) and/or display device(s) of system 300.

In certain embodiments, the user devices (e.g., user device 340) can be desktop computers, laptop computers, mobile devices, and/or other endpoint devices used by one or more users (e.g., user 350). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Lumia® or similar product by the Nokia Corporation of Keilaniemi, Espoo, Finland, and/or (iii) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Android™ operating system developed by the Open Handset Alliance, or (iii) the Windows Mobile™ operating system by Microsoft Corp. of Redmond, Washington, United States of America.

In many embodiments, offline processing system 310, runtime spellcheck system 315, and/or web server 320 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to offline processing system 310, runtime spellcheck system 315, and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of offline processing system 310, runtime spellcheck system 315, and/or web server 320. In a similar manner, the processors and/or the non-transitory computer-readable media can be local and/or remote to each other.

Figure 4:
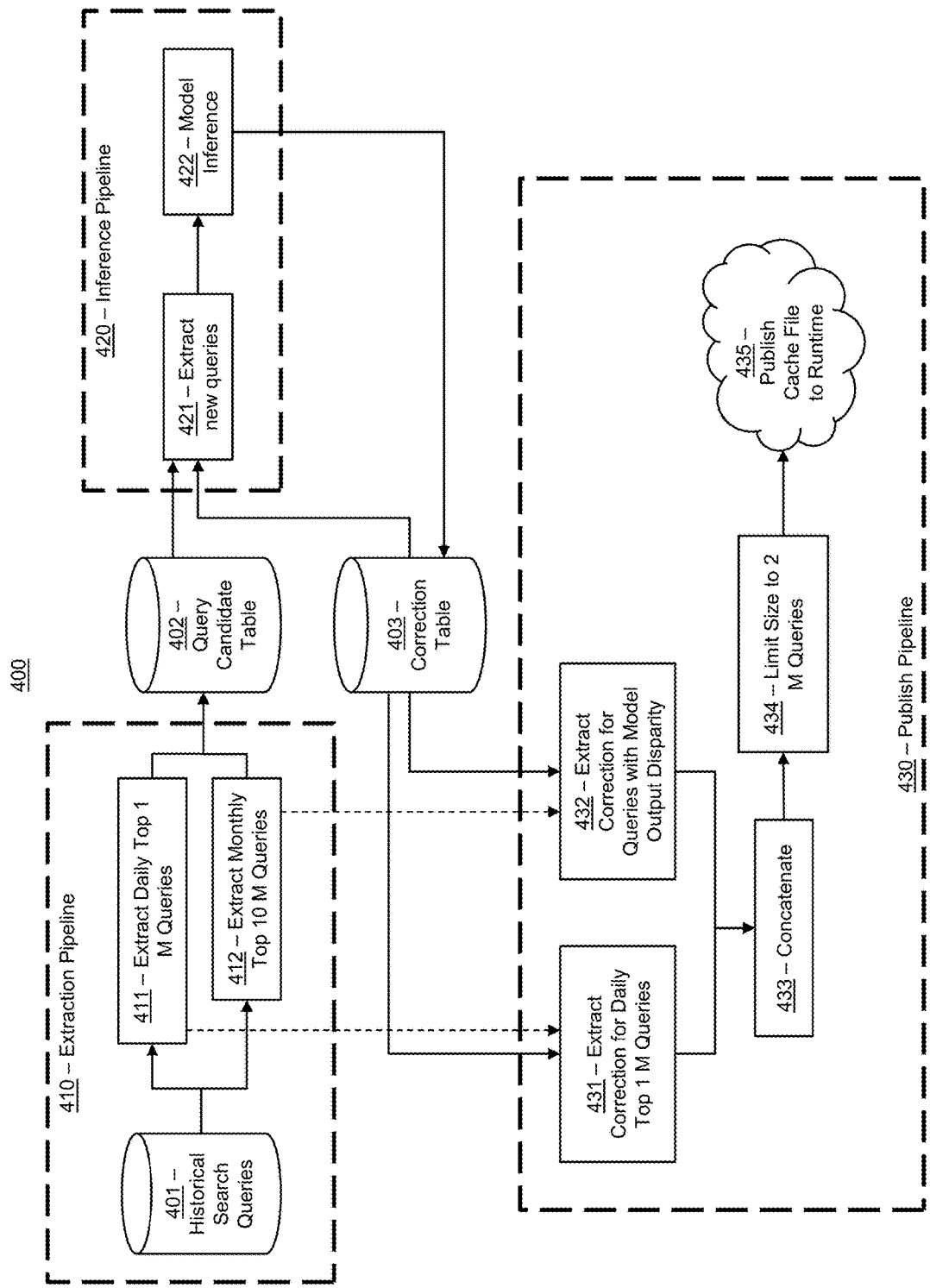
FIG. 4 illustrates a flow chart for a method of offline spellcheck candidates complementing runtime spellcheck, according to another embodiment.

Meanwhile, in many embodiments, offline processing system 310, runtime spellcheck system 315, and/or web server 320 also can be configured to communicate with one or more databases, such as a database system 314. The one or more databases can include a product database that contains information about historical search queries, for example, among other information, such as historical search queries 401, query candidate table 402, and/or correction table 403, as shown in FIG. 4 and described below in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, offline processing system 310, runtime spellcheck system 315, web server 320, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, offline processing system 310 can include an extraction system 311, an inference system 312, a publish system 313, and/or database system 314. In many embodiments, runtime spellcheck system 315 can include a spellcheck cache 316 and/or a low-latency spellchecker 317. In some embodiments, runtime spellcheck system 315 can be part of or can be in communication with a search system, such as a search system (not shown) used by web server 320 to provide search results. In many embodiments, the systems of offline processing system 310 can be modules of computing instructions (e.g., software modules) stored at non-transitory computer readable media that operate on one or more processors. In other embodiments, the systems of offline processing system 310 and/or runtime spellcheck system 315 can be implemented in hardware. Offline processing system 310, runtime spellcheck system 315, and/or web server 320 each can be a computer system, such as computer system 100 (FIG. 1), as described above, and can be a single computer, a single server, or a cluster or collection of computers or servers, or a cloud of computers or servers. In another embodiment, a single computer system can host offline processing system 310, runtime spellcheck system 315, and/or web server 320. Additional details regarding offline processing system 310 and runtime spellcheck system 315 and the components thereof are described herein.

As of late, state-of-the-art spellcheck systems often are implemented using deep learning models which are very powerful in terms of spell their spell correction capabilities. However, as the model becomes more powerful and accurate, it typically has a higher latency, such that it is does not perform fast enough to be incorporated into runtime spellchecking in a real-time search system. One approach to address this problem is to create a cache of corrections for the top queries (e.g., the most common 1 million queries), and use a faster, but less accurate, spellcheck model for other queries. A drawback to this approach is that many queries are not in the top queries, but nonetheless occur frequently enough, and the corrections produced by the faster, but less accurate, spellcheck model are incorrect (e.g., false positives or false negatives). This approach can thus lead to degraded correction performance.

In a number of embodiments, the techniques described herein can offset the performance gap caused by using a less accurate, but faster, model instead of a more accurate, but slower, model by adding additional queries to the cache of corrections when the output of the slower model is different from the output of the faster model.

Turning ahead in the drawings, FIG. 4 illustrates a flow chart for a method 400 of offline spellcheck candidates complementing runtime spellcheck, according to another embodiment. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, system 300 (FIG. 3) and/or offline processing system 310 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of system 300 (FIG. 3). The processor(s) can be similar or identical to the processor(s) described above with respect to computer system 100 (FIG. 1).

In some embodiments, method 400 and other activities in method 400 can include using a distributed network including distributed memory architecture to perform the associated activity. This distributed architecture can reduce the impact on the network and system resources to reduce congestion in bottlenecks while still allowing data to be accessible from a central location.

As shown in FIG. 4, method 400 can include an extraction pipeline 410, an inference pipeline 420, and/or a publish pipeline 430. In many embodiments, extraction pipeline 410 can be at least partially performed by extraction system 311 (FIG. 3), inference pipeline 420 can be at least partially performed by inference system 312 (FIG. 3), and/or publish pipeline 430 can be at least partially performed by publish system 313 (FIG. 3). In many embodiments, method 400 can be performed offline, but the output of method 400 can be used in runtime processing (e.g., to process live search requests in real-time).

In many embodiments, extraction pipeline 410 can extract query information from historical search queries 401, which can be historical information about search queries and the frequency of such search queries. In a number of embodiments, extraction pipeline 410 can include an activity 411 of extracting the daily top (most frequently occurring) 1 million queries. The amount of top queries extracted in activity 411 can be another suitable number (e.g., 0.5 million, 2 million, etc.), and/or the time period for the top queries can be another suitable time period (e.g., six hours, half day, two days, three days, week, etc.). In several embodiments, extraction pipeline 410 can include an activity 412 of extracting the monthly top 10 million queries. The amount of top queries extracted in activity 412 can be another suitable number (e.g., 5 million, 20 million, etc.), and/or the time period for the top queries can be another suitable time period (e.g., two weeks, two months, six months, etc.). In many embodiments, the time period that applies to activity 412 can be longer than the time period that applies to activity 411. This information can be extracted from historical search queries 401. In many embodiments, activity 411 and activity 412 can be run sequentially or in parallel, such as using parallel processing. In many embodiments, these queries can be stored in query candidate table 402.

In many embodiments, extraction pipeline 410 can be run daily or at another suitable interval, to refresh the data in query candidate table 402. In some embodiments, the schema of query candidate table 402 can be <query, traffic, sc_strata>. The sc_strata variable can have value of top1M (when the query is in the daily top 1 million) or other (when the query is not in the daily top 1 million). The partition column can be sc_strata. This information can be used in publish pipeline 430.

In several embodiments, inference pipeline 420 can be used to determine queries for which a full version of the spellcheck model (e.g., a model that has higher accuracy, but is slower) has a different output than a light version of the spellcheck model (e.g., a model that has lower accuracy, but is faster). In many cases, one or more of the spellcheck models are machine-learning models. In several cases, one or more of the spellcheck models are deep-learning models. For example, one or more of the spellcheck models can be transformer-based sequence-to-sequence models that use encoder and decoder layers. In some embodiments, the light version of the spellcheck model can be a different type of spellcheck model than the full version of the spellcheck model.

In some embodiments, the full version of the spellcheck model can have more layers than the light version of the spellcheck mode. For example, the full version can have 6 layers, or another suitable number of layers, and the light version can have 4 layers, or another suitable number of layers. In some embodiments, the full version of the spellcheck model can have a higher embedding dimension than the light version. For example, the full version can have an embedding dimension of 1024, or another suitable dimension, and the light version can have an embedding dimension of 512, or another suitable dimension. In some embodiments, the full version of the spellcheck model can have a higher feed forward dimension than the light version. For example, the full version can have a feed forward dimension of 4096, or another suitable dimension, and the light version can have a feed forward dimension of 1024, or another suitable dimension. In some embodiments, the full version of the spellcheck model can have a higher number of attention heads than the light version. For example, the full version can have 16 attention heads, or another suitable number, and the light version can have 8 attention heads, or another suitable number.

Due to the lighter (e.g., smaller) nature of the light model, it can perform faster, yet less accurately, than the full model. For example, the light version of the spellcheck model can finish spellchecking 99 percent of the queries within 30 ms, while the full version of the spellcheck model can finish spellchecking 99 percent of the queries within 150 ms. These latency differences can be significant in real-time operations, such as spellchecking a search query.

In many embodiments, inference pipeline 420 can include an activity 421 of extracting new queries from query candidate table 402, based on queries that are not already in a correction table 403. When method 400 is first run, correction table has not yet been populated, so all of the queries can be extracted in activity 421. After method 400 has been run and correction table has been populated, activity 421 can extract those queries from query candidate table 402 that are not already in correction table 403.

In several embodiments, inference pipeline 420 can include an activity 422 of performing model inference, which can involve running the full version of the spellcheck model and running the light version of the spellcheck model on each of the queries extracted in activity 421. As the full version of the spellcheck model is generally much more accurate that the light version of the spellcheck model, the output generated by full version of the spellcheck model can be output as the correction for the query to correction table 403. Additionally, activity 422 can determine which queries have outputs that differ across the two models. These queries can be flagged as having a model output disparity, and this information can be added to correction table 403 in addition to the query and its associated correction.

In many embodiments, activity 422 can be deployed using a batch process through parallel processing. For example, a coordinator process can divided up the queries into multiple batches, and orchestrate triggering multiple worker nodes to process the batches in parallel. For example, 30 worker nodes of type n1-highmem-32 (no GPU (graphics processing unit)) can be triggered to perform spellchecking using both models for the queries, which collectively can handle 10 million queries in under 2 hours. Because activity 421 extracts a smaller version of the queries on subsequent runs, the time to run activity 422 is even shorter if using the same 30 worker nodes. In some embodiments, each worker endpoint can take a list of queries as the input, and, in some cases, model names on which the run the inference. The models can be invoked in a sequential fashion, producing corrections for each model. The output of the worker node is corrections for each query from each model.

In many embodiments, inference pipeline 420 can be run daily or at another suitable interval, to add to the data in correction table 403. In some embodiments, the schema of correction table 403 can be <query, correction_model_1, correction_model_2, inference date, model_1_version, model_2_version>. The partition columns can be model_1_version, model_2_version. As extractions continue each time method 400 is run, correction table 403 can continue to grow. In some embodiments, correction table can be refreshed when a model version changes, and/or entries with an inference date indicating that they are older than a predetermined or customizable age can be deleted from correction table 403.

In a number of embodiments, publish pipeline 430 can prepare a spellcheck cache file to be loaded into the runtime environment, such as loaded as spellcheck cache 316 (FIG. 3) in runtime spellcheck system 315 (FIG. 3), which can be used to override the light version of the model (e.g., low-latency spellchecker 317 (FIG. 3)) that is otherwise used to spellcheck the queries.

In many embodiments, publish pipeline 430 can include an activity 431 of extracting the queries and corrections for the daily top 1 million queries, based on the queries extracted in activity 411 and the corrections stored in correction table 403. In many embodiments, all of these queries and corrections can be included in the spellcheck cache, even when the query does not include an error to be corrected, and/or regardless of whether or not there is a disparity in the model output. By including the daily top 1 million queries in the spellcheck cache, the most common queries can be handled quickly with the cache lookup without running the light model, as the cache lookup for a query is faster than running the light version of the spellcheck model on a query.

In a number of embodiments, publish pipeline 430 also can include an activity 432 of extracting the queries and corrections from the correction table in which there is a model output disparity. In many embodiments, the output of activity 412 can be used in activity 432 to extract those queries with a model output disparity that are also in the monthly top 10 million queries.

In several embodiments, publish pipeline 430 additionally can include an activity 433 of concatenating the outputs of activities 431 and 432. In several embodiments, if a query is already in the output of activity 431, that query can be excluded from the output of activity 432 for purposes of concatenating the outputs of activities 431 and 432.

In a number of embodiments, publish pipeline 430 further can include an activity 434 of limiting the size of the output of activity 433, such as to 2 million queries or to another suitable number of queries. For example, the daily top 1 million queries can be included, and another 1 million queries can be included in which there is a model output disparity. In many embodiments, the most frequent queries (e.g., queries with the highest frequency) can be the ones included in the second 1 million queries, and other less frequent queries can be excluded in activity 434.

In several embodiments, publish pipeline 430 additionally can include an activity 435 of publishing a cache file (e.g., spellcheck cache 316 (FIG. 3)) to the runtime environment (e.g., runtime spellcheck system 315 (FIG. 3)). The cache file can be populated with the pairs of queries and corrections for the queries output from activity 434. In the runtime environment, the cache file can advantageously reduce latency for spellchecking queries that have already been seen previously, at least those that are more frequent. By also adding in queries that have model output disparity, the cache file also beneficially improves the spellcheck correction quality in terms of precision and recall to match the full model's metrics.

Figure 5:
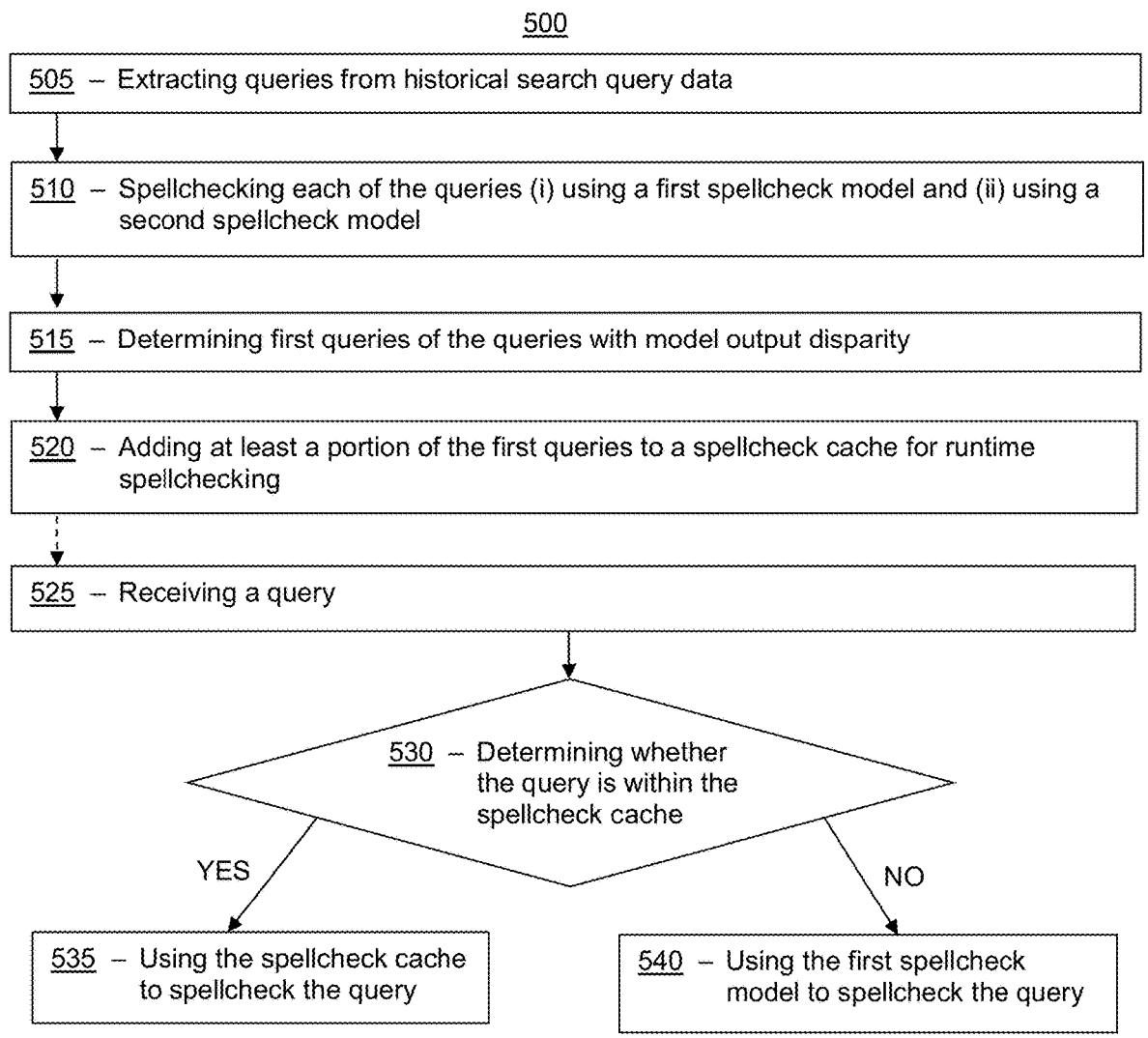
FIG. 5 illustrates a flow chart for a method of providing offline spellcheck candidates complementing runtime spellcheck, according to another embodiment.

Turning ahead in the drawings, FIG. 5 illustrates a flow chart for a method 500 of providing offline spellcheck candidates complementing runtime spellcheck, according to another embodiment. Method 500 is merely exemplary and is not limited to the embodiments presented herein. Method 500 can be employed in many different embodiments or examples not specifically depicted or described herein. In some embodiments, the procedures, the processes, and/or the activities of method 500 can be performed in the order presented. In other embodiments, the procedures, the processes, and/or the activities of method 500 can be performed in any suitable order. In still other embodiments, one or more of the procedures, the processes, and/or the activities of method 500 can be combined or skipped.

In many embodiments, system 300 (FIG. 3), offline processing system 310 (FIG. 3), runtime spellcheck system 315, and/or web server 320 (FIG. 3) can be suitable to perform method 500 and/or one or more of the activities of method 500. In these or other embodiments, one or more of the activities of method 500 can be implemented as one or more computing instructions configured to run at one or more processors and configured to be stored at one or more non-transitory computer readable media. Such non-transitory computer readable media can be part of system 300 (FIG. 3). The processor(s) can be similar or identical to the processor(s) described above with respect to computer system 100 (FIG. 1).

In some embodiments, method 500 and other activities in method 500 can include using a distributed network including distributed memory architecture to perform the associated activity. This distributed architecture can reduce the impact on the network and system resources to reduce congestion in bottlenecks while still allowing data to be accessible from a central location.

Referring to FIG. 5, method 500 can include an activity 505 of extracting queries from historical search query data. The historical search query data can be similar or identical to historical search queries 401 (FIG. 4). Activity 505 can be similar or identical to activity 412 (FIG. 4). In many embodiments, the queries can be the top queries in the historical search query data during a first time period. For example, as described in connection with activity 412 (FIG. 4), the time period can be two weeks, one month, two months, six months, or another suitable time period.

In a number of embodiments, method 500 also can include an activity 510 of spellchecking each of the queries (i) using a first spellcheck model and (ii) using a second spellcheck model. In many embodiments, a latency of the first spellcheck model is lower than a latency of the second spellcheck model, and an overall accuracy of the second spellcheck model is higher than an overall accuracy of the first spellcheck model. The first spellcheck model can be similar or identical to low-latency spellchecker 317 (FIG. 3) and/or the light version of the spellcheck model described above in connection with inference pipeline 420 (FIG. 4). Activity 510 can be similar or identical to activity 422 (FIG. 4).

In a number of embodiments, the first spellcheck model and the second spellcheck model are each a respective transformer-based sequence-to-sequence machine-learning model. In some embodiments, a layer quantity of first spellcheck model is less than a layer quantity of the second spellcheck model. In some embodiments, an embedding dimension of the first spellcheck model is less than an embedding dimension of the second spellcheck model.

In several embodiments, method 500 additionally can include an activity 515 of determining first queries of the queries in which, for each of the first queries, a first respective spellcheck output from the first spellcheck model is different from a second respective spellcheck output from the second spellcheck model. Activity 515 can be similar or identical to activity 432 (FIG. 4). The first queries can be similar or identical to the output of activity 432 (FIG. 4).

In a number of embodiments, method 500 further can include an activity 520 of adding at least a portion of the first queries to a spellcheck cache for runtime spellchecking. Activity 520 can be similar or identical to activity 435 (FIG. 4). Spellcheck cache. The spellcheck cache can be similar or identical to spellcheck cache 316 (FIG. 3). The at least a portion of the first queries can be similar or identical to those queries output from activity 432 (FIG. 4) that were not filtered out by activity 434 (FIG. 4). In many embodiments, the spellcheck cache can map the at least the portion of the first queries to corrections for the at least the portion of the first queries. In several embodiments, the corrections can be based at least in part on the second respective spellcheck outputs for the first queries.

In some embodiments, the spellcheck cache can include a hashmap comprising keys and values. The keys of the hashmap can include the at least the portion of the first queries, and the values of the hashmap comprise corrections for the at least the portion of the first queries.

In some embodiments, the spellcheck cache further can include second queries that are top queries in the historical search query data during a second time period. The second queries can be similar or identical to the queries output from activity 431 (FIG. 4)

In several embodiments, method 500 additionally and optionally can include further activities 525-540 in runtime spellchecking. In many embodiments, method 500 can include an activity 525 of receiving a query. For example, the query can be a search query entered by a user (e.g., user 350 (FIG. 3)).

In a number of embodiments, method 500 further can include an activity 530 of determining whether the query is within the spellcheck cache. For example, a lookup call can be made to spellcheck cache 316 (FIG. 3) to determine whether the query is within the spellcheck cache.

When the output of activity 530 is yes and the query is within the spellcheck cache, method 500 can proceed to an activity 535 of using the spellcheck cache to spellcheck the query. For example, the correction in the query-correction pair for the query within the spellcheck cache can be used for the spellcheck. As noted above, the correction can be either (i) different from the query when there is a spelling error in the query or (ii) the same as the query when there is no spelling error in the query.

When the output of activity 530 is no and the query is not within the spellcheck cache, method 500 can proceed to an activity 540 of using the first spellcheck model to spellcheck the query. For example, low-latency spellchecker 317 (FIG. 3) can be used to spellcheck the query.

In many embodiments, activities 505-520 can be performed at least in part by offline processing system 310 (FIG. 3), and activities 530-540 can be performed at least in part by runtime spellcheck system 315 (FIG. 3).

In many embodiments, the techniques described herein can provide a practical application and several technological improvements. In some embodiments, the techniques described herein can provide for offline spellcheck candidates complementing runtime spellcheck. The techniques described herein can provide a significant improvement over conventional approaches that fail have degraded correction performance and/or high latency.

In a number of embodiments, the techniques described herein can solve a technical problem that arises only within the realm of computer networks, as search engines and spellcheck systems do not exist outside the realm of computer networks. Moreover, the techniques described herein can solve a technical problem that cannot be solved outside the context of computer networks. Specifically, the techniques described herein cannot be used outside the context of computer networks, the lack of search engines and the inability to perform machine learning models without a computer.

Various embodiments can include a system including one or more processors and one or more non-transitory computer-readable media storing computing instructions that, when executed on the one or more processors, cause the one or more processors to perform certain acts. The acts can include extracting queries from historical search query data. The acts also can include spellchecking each of the queries (i) using a first spellcheck model and (ii) using a second spellcheck model. A latency of the first spellcheck model is lower than a latency of the second spellcheck model, and an overall accuracy of the second spellcheck model is higher than an overall accuracy of the first spellcheck model. The acts additionally can include determining first queries of the queries in which, for each of the first queries, a first respective spellcheck output from the first spellcheck model is different from a second respective spellcheck output from the second spellcheck model. The acts further can include adding at least a portion of the first queries to a spellcheck cache for runtime spellchecking.

A number of embodiments can include a method being implemented via execution of computing instructions configured to run at one or more processors. The method can include extracting queries from historical search query data. The method also can include spellchecking each of the queries (i) using a first spellcheck model and (ii) using a second spellcheck model. A latency of the first spellcheck model is lower than a latency of the second spellcheck model, and an overall accuracy of the second spellcheck model is higher than an overall accuracy of the first spellcheck model. The method additionally can include determining first queries of the queries in which, for each of the first queries, a first respective spellcheck output from the first spellcheck model is different from a second respective spellcheck output from the second spellcheck model. The method further can include adding at least a portion of the first queries to a spellcheck cache for runtime spellchecking.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

Although offline spellcheck candidates complementing runtime spellcheck has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4-5 may include different procedures, processes, and/or activities and be performed by many different modules, in many different orders, and/or one or more of the procedures, processes, or activities of FIGS. 4-5 may include one or more of the procedures, processes, or activities of another different one of FIGS. 4-5. As another example, the systems within system 300 (FIG. 3) can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions that, when executed on the one or more processors, cause the one or more processors to:
   extract queries from historical search query data;
   spellcheck each of the queries (i) using a first spellcheck model and (ii) using a second spellcheck model, wherein a latency of the first spellcheck model is lower than a latency of the second spellcheck model, and
   wherein an overall accuracy of the second spellcheck model is higher than an overall accuracy of the first spellcheck model;
   determine first queries of the queries in which, for each of the first queries, a first respective spellcheck output from the first spellcheck model is different from a second respective spellcheck output from the second spellcheck model; and
   add at least a portion of the first queries to a spellcheck cache, for runtime spellchecking, that is configured to override the first spellcheck model and that maps the portion of the first queries to one or more corrections based at least in part on the second respective spellcheck output for the portion of the first queries.

2. The system of claim 1, wherein the computing instructions, when executed on the one or more processors, further cause the one or more processors to, during the runtime spellchecking:
   receive a query;
   determine whether the query is within the spellcheck cache;
   when the query is within the spellcheck cache, use the spellcheck cache to spellcheck the query; and
   when the query is not within the spellcheck cache, use the first spellcheck model to spellcheck the query.

3. The system of claim 1, wherein:
   the spellcheck cache comprises a hashmap comprising keys and values;
   the keys comprise the portion of the first queries; and
   the values comprise the one or more corrections.

4. The system of claim 1, wherein the queries are top queries in the historical search query data during a first time period.

5. The system of claim 1, wherein the spellcheck cache further comprises second queries that are top queries in the historical search query data during a second time period.

6. The system of claim 1, wherein the first spellcheck model and the second spellcheck model are each a respective transformer-based sequence-to-sequence machine-learning model.

7. The system of claim 1, wherein a layer quantity of the first spellcheck model is less than a layer quantity of the second spellcheck model.

8. The system of claim 1, wherein an embedding dimension of the first spellcheck model is less than an embedding dimension of the second spellcheck model.

9. A method implemented via execution of computing instructions configured to run at one or more processors, the method comprising:
  extracting queries from historical search query data;
  spellchecking each of the queries (i) using a first spellcheck model and (ii) using a second spellcheck model,
    wherein a latency of the first spellcheck model is lower than a latency of the second spellcheck model, and
    wherein an overall accuracy of the second spellcheck model is higher than an overall accuracy of the first spellcheck model;
  determining first queries of the queries in which, for each of the first queries, a first respective spellcheck output from the first spellcheck model is different from a second respective spellcheck output from the second spellcheck model; and
  adding at least a portion of the first queries to a spellcheck cache, for runtime spellchecking, that is configured to override the first spellcheck model and that maps the portion of the first queries to one or more corrections based at least in part on the second respective spellcheck output for the portion of the first queries.

10. The method of claim 9, further comprising, during the runtime spellchecking:
  receiving a query;
  determining that the query is within the spellcheck cache; and
  using, based on determining that the query is within the spellcheck cache, the spellcheck cache to spellcheck the query.

11. The method of claim 9, wherein the spellcheck cache maps the portion of the first queries to corrections for the portion of the first queries.

12. The method of claim 11, wherein the corrections are based at least in part on the second respective spellcheck output for the portion of the first queries.

13. The method of claim 9, wherein:
  the spellcheck cache comprises a hashmap comprising keys and values;
  keys comprise the portion of the first queries; and
  the values comprise corrections for the portion of the first queries.

14. The method of claim 9, wherein the queries are top queries in the historical search query data during a first time period.

15. The method of claim 9, wherein the spellcheck cache further comprises second queries that are top queries in the historical search query data during a second time period.

16. The method of claim 9, wherein the first spellcheck model and the second spellcheck model are each a respective transformer-based sequence-to-sequence machine-learning model.

17. The method of claim 9, wherein a layer quantity of the first spellcheck model is less than a layer quantity of the second spellcheck model.

18. The method of claim 9, wherein an embedding dimension of the first spellcheck model is less than an embedding dimension of the second spellcheck model.

19. One or more non-transitory, computer-readable media, comprising instructions that, when executed by one or more processors, cause the one or more processors to:
  extract a query queries from historical search query data;
  spellcheck a query, of the queries, using a first spellcheck model and using a second spellcheck model,
    wherein a latency of the first spellcheck model is lower than a latency of the second spellcheck model, and
    wherein an overall accuracy of the second spellcheck model is higher than an overall accuracy of the first spellcheck model;
  determine that, for the query, a first spellcheck output from the first spellcheck model is different from a second spellcheck output from the second spellcheck model; and
  add the query at least a portion of the queries to a spellcheck cache that is configured to override the first spellcheck model and that maps the query the portion of the queries to one or more corrections based at least in part on the second spellcheck output, wherein the portion of the queries includes the query.

20. The one or more non-transitory, computer-readable media of claim 19, wherein a layer quantity of the first spellcheck model is less than a layer quantity of the second spellcheck model.

* * * * *